Dec. 15, 1931.  M. A. ACHESON ET AL  1,836,891
MEANS FOR REGULATING THE OPERATION OF SPACE DISCHARGE DEVICES

Filed May 10, 1928

Inventors:
Marcus A. Acheson
James L. Zehner
by Charles E. Tullar
Their Attorney.

Patented Dec. 15, 1931

1,836,891

UNITED STATES PATENT OFFICE

MARCUS A. ACHESON AND JAMES L. ZEHNER, OF SCHENECTADY, NEW YORK, ASSIGNORS TO GENERAL ELECTRIC COMPANY, A CORPORATION OF NEW YORK

MEANS FOR REGULATING THE OPERATION OF SPACE DISCHARGE DEVICES

Application filed May 10, 1928. Serial No. 276,741.

Our invention relates to means for regulating the operation of space discharge devices, such as vapor electric rectifiers, and has for its principal object the provision of an improved apparatus and method of operation whereby an electrical condition at the output terminals of such devices may be either maintained substantially constant over a predetermined range of operation or caused to vary in any desired manner with respect to change in the resistance of the load circuit connected to the output terminals of the device.

It is well known that the output voltage of a vapor electric device tends to vary with change in the resistance of the load circuit connected to its output terminals. In accordance with our invention, this result is avoided wholly or in part by the provision of an improved means for controlling the grid or input potential of the vapor electric device.

Our invention will be better understood from the following description when considered in connection with the accompanying drawings and its scope will be pointed out in the appended claims.

Figure 1:
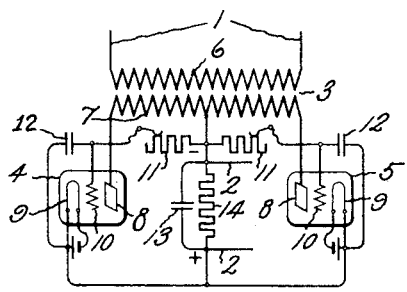
Figure 2:
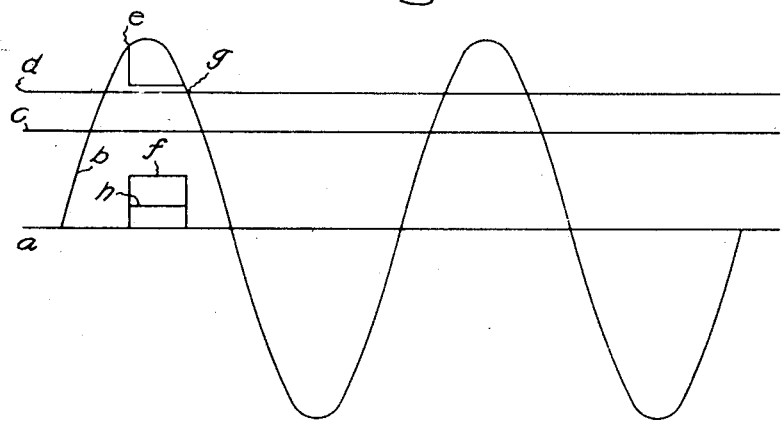

Referring to the drawings, Fig. 1 is a wiring diagram of an alternating current rectifying apparatus wherein our invention has been embodied; and Fig. 2 relates to the operation of this apparatus.

This apparatus includes alternating current supply terminals 1 and direct current output terminals 2 which are interconnected through a rectifying apparatus including a transformer 3 and a pair of vapor electric rectifiers 4 and 5. The transformer 3 includes a primary winding 6 and a secondary winding 7 which is provided with a pair of end terminals and with an intermediate terminal connected directly to the upper direct current load terminal 2. The space discharge device 4 includes an anode 8 connected to an end terminal of the winding 7, a cathode connected to the lower direct current load terminal 2, and a grid 10 which is connected to a part of the load resistance more negative than the cathode, such as upper direct current load terminal 2, through an impedance device shown as a resistor 11 and to the cathode 9 through a condenser 12 or other suitable means for smoothing the current supplied to the grid 10.

The connections of the device 5 are the same as those of the device 4 and will therefore be readily understood without detailed description. It should be understood that the receptacles of the devices 4 and 5 preferably contain a gas such as argon, mercury vapor or the like. If desired, a smoothing condenser 13 may be connected in shunt to the direct current load which is indicated at 14.

The operation of the apparatus will be readily understood upon consideration of Fig. 2 wherein the potential of the upper direct current load terminal 2 at successive intervals of time is indicated by a curve $a$, the alternating potential of the anode 8 is indicated by a curve $b$, the potential of the grid 10 is indicated by a curve $c$, and the potential of the cathode 9 is indicated by a curve $d$.

From these various curves it will be apparent that the potential of the grid 10 is more negative than that of the cathode 9 and is dependent both on the direct current load potential and on the potential drop of the resistor 11. The potential between the direct current load terminals 2 is of course dependent on the resistance of the direct current load. The potential between the terminals of the resistor 11 is opposed to the direct current load potential and is dependent on the positive ion current drawn from the positive ion sheath of the grid and transmitted through the grid circuit during the period when electron current is transmitted between the cathode and anode of the device. Under these conditions, the grid 10 is subjected to a negative bias potential which is the resultant difference between the voltage of the direct current load circuit and the potential drop produced between the terminals of the resistor 11 by the positive ion current of the grid circuit.

With a direct current potential $a-d$ between the direct current load circuit terminals and a resultant negative bias potential $c-d$ applied to the grid 10, it may be assumed that the electrical characteristics of the apparatus are such that current starts between the anode 8 and cathode 9 at an instant $e$ when the alternating voltage of the anode attains a value sufficiently high to produce this result. The anode current, which is indicated by a curve $f$, continues until the instant $g$ when the anode voltage becomes less than the rectified direct current voltage. During the time interval between the instants $e$ and $g$ a positive ion current represented by the curve $h$ is transmitted through the grid circuit and a potential drop equal to the difference between the voltages $c$ and $a$ is produced in the resistor 11.

So long as the anode voltage and the resistance of the direct current load circuit remain unchanged, the current transmitted by the device 4 during the alternate half cycles of the anode voltage will begin at instants corresponding to the instant $e$ and will be interrupted at instants corresponding to the instant $g$.

If the resistance of the direct current load circuit decreases, however, the voltage $a$—$d$ between the direct current terminals 2 tends to decrease and to cause the device 4 to transmit current during a time interval which begins before the instant $e$ and ends after the instant $g$. Due to this increase in anode current, a greater positive ion current is transmitted through the resistor 11, the potential drop of this resistor is increased, the grid potential approaches that of the cathode, and the direct current voltage is caused to assume a value which may be equal to its original value or may be greater or less than this value depending on the adjustment of the resistor 11.

Likewise if the resistance of the direct current load circuit increases, the voltage between the direct current load circuit terminals 2 tends to increase and to cause the device 4 to transmit current during a time interval which begins after the instant $e$ and ends before the instant $g$. Due to this decrease in anode current, a smaller positive ion current is transmitted through the resistor 11, the potential drop of this resistor is decreased, the difference between the cathode and grid potentials becomes greater, and the direct current voltage is caused to assume a value which may be equal to its original value or may be greater or less than this value dependent on the adjustment of the resistor 11.

As will be apparent to those skilled in the art, the resistor 11 may be adjusted to maintain the direct current voltage substantially constant irrespective of change in the resistance and current of the direct current load circuit or may be adjusted to produce direct current voltage changes which vary directly as or inversely with changes in the resistance of the direct current circuit. It will of course be understood that the operation of the device 5 is similar to that of the device 4 and that the successive half cycles of anode voltage are alternately rectified by the devices 4 and 5 respectively.

The embodiment of the invention illustrated and described herein has been selected for the purpose of clearly setting forth the principles involved. It will be apparent however that the invention is susceptible of being modified to meet the different conditions encountered in its use and we therefore aim to cover by the appended claims all modifications within the true spirit and scope of our invention.

What we claim as new and desire to secure by Letters Patent of the United States, is:

1. The combination of a direct current load circuit, an alternating current apparatus, a vapor electric discharge device provided with a circuit including a cathode and anode connected to said apparatus through said load circuit and with a grid, and an impedance path for the positive ion current of said grid between said grid and a part of said load circuit which is more negative than the cathode of said device.

2. The combination of a direct current load circuit, an alternating current apparatus, a vapor electric discharge device provided with an anode circuit connected to said apparatus through said load circuit and with a grid, and means for applying to said grid a potential which varies directly as the voltage of said load circuit and inversely as the positive ion current of said device.

3. The combinaton of a direct current load circuit, an alternating current apparatus, a vapor electric discharge device provided with an anode circuit connected to said apparatus through said load circuit and with a grid, and means for applying to said grid a bias potential which is dependent on the resistance of said load circuit and the positive ion current of said device.

4. The combination of a direct current load circuit, an alternating current apparatus, a vapor electric discharge device provided with an anode circuit connected to said apparatus through said load circuit and with a grid, and a resistor connected between said grid and the negative terminal of said load circuit.

5. The combination of an impedance device, a direct current load circuit, an alternating current apparatus, a vapor electric device provided with an anode connected to said apparatus, with a cathode connected to the positive terminal of said load circuit and with a grid connected to the negative terminal of said load circuit through said impedance device, and a connection between said apparatus and said negative terminal.

6. The combination of an impedance device, a direct current load circuit, an alternating current apparatus, a vapor electric device provided with an anode connected to said apparatus, with a cathode connected to the positive terminal of said load circuit and with a grid connected to the negative terminal of said load circuit through said impedance device, a connection between said apparatus and negative terminal, and filter means connected between said grid and cathode.

7. The combination of a direct current load circuit, an alternating current apparatus, a vapor electric discharge device interconnecting said circuit and said apparatus, and means responsive to the ionization of said discharge device for effecting a predetermined voltage regulation of said load circuit.

8. The combination of a direct current load circuit, an alternating current apparatus, a vapor electric discharge device interconnecting said circuit and said apparatus, and means responsive to the positive ion current in said device for effecting a predetermined regulation of the voltage of said load circuit.

9. The combination of a direct current load circuit, an alternating current apparatus, a vapor electric discharge device interconnecting said circuit and said apparatus, and means responsive to the positive ion current in said device and to the resistance of said load circuit for effecting a predetermined regulation of the voltage of said load circuit.

10. The combination of a direct current load circuit, an alternating current apparatus, a vapor electric discharge device provided with an anode circuit connected to said apparatus through said load circuit and with a grid, and means responsive to the positive ion current of said device for controlling the potential of said grid.

In witness whereof, we have hereunto set our hands this 9th day of May, 1928.

MARCUS A. ACHESON.
JAMES L. ZEHNER.